July 7, 1964  H. L. RANDOLPH ETAL  3,140,372
SPRING-CLIP MOUNTED MANUALLY OPERABLE MEANS FOR MODIFYING
THE ACTION OF AN AUTOMATIC CONTROL DEVICE
Filed Oct. 31, 1961  2 Sheets-Sheet 1

INVENTORS.
HOLLIS L. RANDOLPH
MICHAEL J. CAPARONE
BY  MARVIN M. GRAHAM

Mead, Browne, Schuyler, & Beveridge

ATTORNEYS.

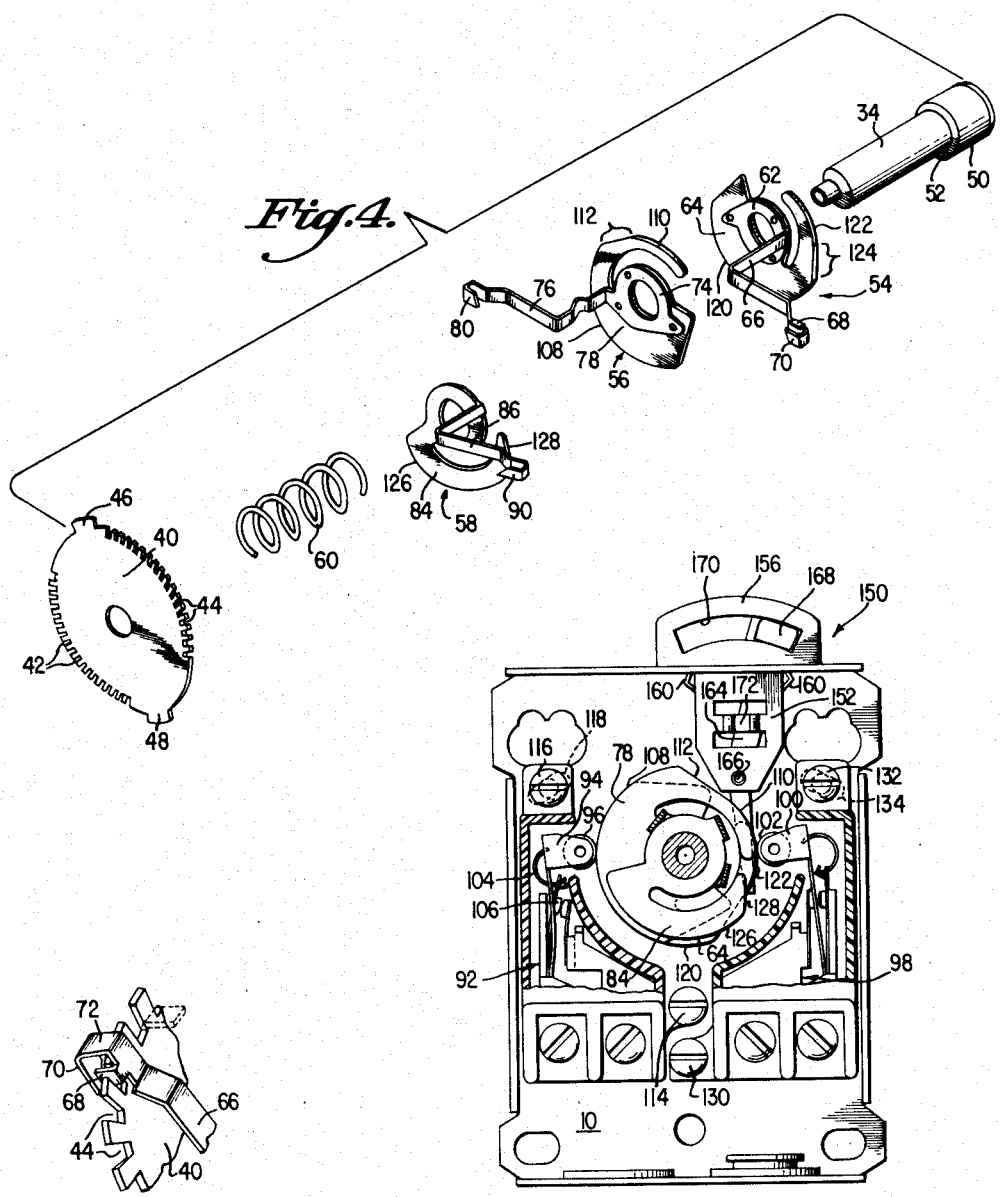

United States Patent Office 3,140,372
Patented July 7, 1964

3,140,372
SPRING-CLIP MOUNTED MANUALLY OPERABLE MEANS FOR MODIFYING THE ACTION OF AN AUTOMATIC CONTROL DEVICE
Hollis L. Randolph, Lakewood, Michael J. Caparone, Arcadia, and Marvin M. Graham, Rolling Hills, Calif., assignors to Robertshaw Controls Company, a corporation of Delaware
Filed Oct. 31, 1961, Ser. No. 149,029
5 Claims. (Cl. 200—138)

This invention relates to control devices, and more particularly to a thermostatically responsive combination fan and limit switch employed to control an electrically operated fan and an electrically operated intake valve of a forced heating system.

In its preferred environment, the control device described below is employed to control operation of a forced air heating system in changes in air temperature within the system. Functional requirements of the device are that it must operate a fan to blow warm air through the system when operation of the furnace has raised the air temperature within the system to a desired temperature and to stop operation of the fan upon cooling of the air within the system following termination of the operation of the furnace as by a room thermostat. In the usual case, the fan switch operating structure is combined with a control limit switch connected to discontinue operation of the furnace when the air within the system reaches an undesirably high temperature independently of operation of the normal controlling thermostat mounted in the room being heated.

It is a primary object of the invention to provide a control device of the type referred to above in which a readily adjustable positive engagement type dial setting is achieved which is precisely maintained and is not subject to change due to shock or vibrational action.

Another object of the invention is to provide a control device of the type referred to above in which a switch controlling cam is rotatably locked to a rotatable dial shaft by a resiliently maintained positive engagement coupling.

Still another object of the invention is to provide a control device of the type referred to above employing a resilient arm for resiliently maintaining a positive engagement coupling wherein resilient movement of the arm is confined to movement within its elastic limits.

Still another object of the invention is to provide a positive engagement type coupling for angularly adjusting a switch operating cam upon a shaft within a selected range of angular movement in which positive limits of angular movement may be provided without the use of tools.

Still another object of the invention is to provide a control device of the type referred to above wherein a manually operable switch actuator assembly may be inserted or removed from the device without the use of tools.

The foregoing, and other objects, are achieved in a control device in which a shaft is rotatably mounted in a frame and is rotatably positioned relative to the frame by a spiral bimetal element in accordance with the temperature sensed by the bimetal element. A circular dial is mounted on one end of the shaft for rotation with the shaft and is formed with a plurality of uniformly spaced radial slots extending inwardly from its outer periphery. Switch operating cams are mounted on the shaft for rotation relative to the shaft and to each other. Each cam is provided with a resilient radially extending arm having a tab near its outer end axially biassed by the resiliency of the arm toward the dial. The tabs on the respective arms are constructed to be received within the radial slots in the dial and, by bending the outer end axially away from the dial to disengage the tabs from the slots, the tabs and their associated cams may be rotated around the shaft and locked in a selected angular position relative to the shaft by seating the tab within a selected one of radial slots. A dial pointer at the outer end is bent inwardly over the face of the dial remote from the arm to provide the dual function of indicating the position of the arm angularly with respect to the dial and to also limit flexing movement of the arm away from the dial to prevent over bending of the arm during the setting operation.

When employed as a combination fan and limit control, the device is provided with three cams, one of which functions to actuate a snap-action switch for the limit control. The two remaining cams are employed to control operation of the fan switch which is constructed in the form of a snap-action or over center switch. One of the two fan cams is provided with adjacent large and small diameter peripheral portions joined by a transition portion, the respective diameters of the two peripheral portions shifting a cam follower between the fan on and fan off position. The second fan control cam is formed with a circular peripheral portion of a diameter half way between the large and small diameter portions of the first fan cam. The fan switch is adjustably mounted on the device frame so that when the switch operating cam follower is engaged with the periphery of the second cam the switch is moved to its centered position, but is not shifted enough to actuate the switch either way. Thus, when the follower engages the periphery of the second fan cam, the fan control switch remains in its last actuated position and shifts positions only upon movement to the large or to the small diameter portions of the first cam. By angularly adjusting the second fan cam relative to the first fan cam, the circumferential overlap of the peripheral portion of the second cam with the small diameter portion of the first cam provides in effect a three-step cam surface in which the middle or intermediate step is of an adjustably selected length, corresponding to a temperature range within which the fan remains in its last actuated condition.

Other objects and features of the invention will become apparent by reference to the following specification and to the drawings.

In the drawings:

FIG. 4 is an exploded perspective view of the parts forming the cam and dial assembly of the device of FIGS. 1 through 3;

FIG. 5 is a view similar to FIG. 2 with the dial removed and showing the main shaft and portions of the respective cams in section; and FIG. 6 is a detailed perspective view showing features of the inner engagement between the cam arms and dial.

Figure 1:
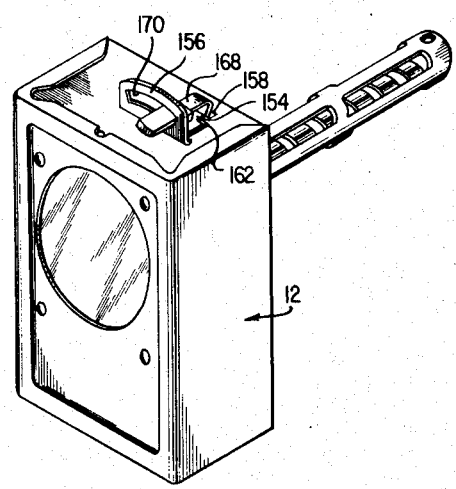
FIG. 1 is an overall perspective view of a control device embodying the present invention.
Figure 2:
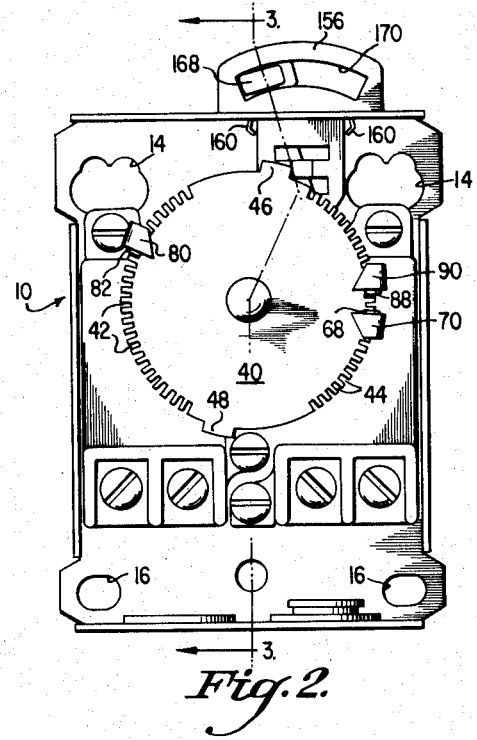
FIG. 2 is a front elevational view of the device of FIG. 1 with the front housing cover removed.
Figure 3:
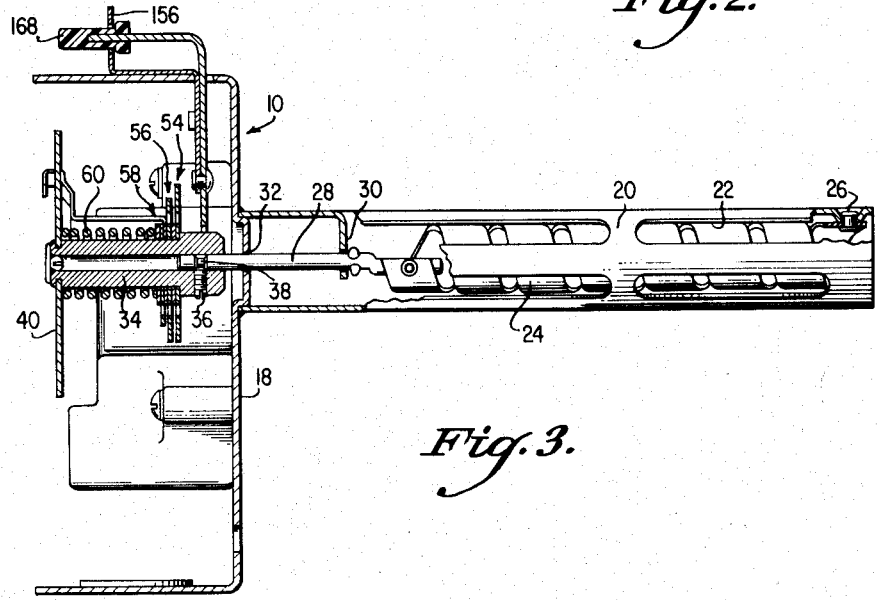
FIG. 3 is a cross-sectional view taken on line 3—3 of FIG. 2.

Referring first to FIGS. 2 and 3, the control device includes a sheet metal frame designated generally 10 which is suitably formed to cooperate with a front cover assembly 12 (FIG. 1) to form an enclosed box-like housing. The rear wall of frame 10 is suitably bored as at 14, 16 to permit mounting of the assembly on the outer side of a hot air duct of a heating system, not shown. Projecting rearwardly from the rear wall 18 of the frame 10 is a tubular support member 20 which is slotted as at 22 to permit the flow of air through the interior of tubular member 20. When the device is mounted in a hot air duct, tubular member 20 projects into the duct and a spiral bimetal element 24 mounted within member 20 is thus responsive to the temperature of air within the duct. The right-hand end of bimetal 24 is fixed to tubular member 20 as by a rivet 26 while the opposite end of bimetal 24 is connected to a crank shaft 28 rotatably journaled in a projection 30 formed on tubular member 20. Flexing movement of spiral bimetal 24 in response to temperature changes causes rotation of crank shaft 28 in a well known manner.

Shaft 28 is also rotatably supported in a bore 32 in rear wall 18 and projects forwardly through the wall. The forward end of shaft 28 is locked to an enlarged diameter second shaft 34 at selected positions of angular adjustment by a set screw 36 threadably received within shaft 34 and engageable within a reduced diameter section 38 in shaft 28. At the forward end of shaft 34, a circular dial 40 is fixedly secured to shaft 34 for rotation with the shaft. Referring now to FIG. 2, the outer periphery of circular dial 40 is provided with a first and second series of uniformly spaced radial slots 42 and 44, respectively, each series of radial slots extending partially around the circumference of dial 40. The two series of slots are separated from each other and radially projecting ears 46 and 48 are formed on dial 40 to further define a separation between the two series of slots for reasons to be described below.

The rearward end of shaft 34 is formed with an enlarged diameter section 50 which terminates in a forwardly facing shoulder 52 to axially locate the first cam designated generally 54 of a cam assembly upon shaft 34. A second cam assembly designated generally 56 and a third cam assembly designated generally 58 are mounted in succession upon shaft 34 and resiliently biassed rearwardly toward shoulder 52 by a compression spring 60 seated between the rear face of dial 40 and the forwardmost cam assembly 58. Each of cam assemblies 54, 56 and 58 is supported upon shaft 34 for rotation relative to the shaft and to each other. Each cam assembly is rotatably locked at a selected position of angular adjustment upon the shaft by the inner engagement between cam assemblies and selected radial slots on dial 40 by structure to be described in greater detail below.

Referring first to cam assembly 54, a disc portion 62 is fixedly secured to the forward face of the cam plate 64. Disc portion 62 serves as a spacer between the forward face of cam plate 64 and the next forward cam assembly 56. An integral extension or arm 66 is bent axially forwardly from disc 62 and then radially outwardly in the fashion best seen in FIG. 4. At the radial outer end of arm 66, a tab 68 is bent axially forwardly from the arm and the outer tip of arm 66 is bent radially inwardly through 180° to form an inwardly projecting pointer portion 70.

The axial forward extent of arm 66 is such that when cam assembly 54 is positioned upon shaft 34, the circumferential periphery 44 of dial 40 is received between pointer 70 and the axially opposed outer portion of arm 66 with tab 68 projecting axially forwardly through a radial slot 44 in dial 40. The cooperative interrelationship of the pointer, tab, and dial slots are best seen in the perspective view of FIG. 6. The bridging portion 72 by which pointer 70 is integrally coupled to the main portion of arm 66 is of an axial extent substantially greater than the thickness of dial 40 and exceeds the axial length of tab 68 by an amount such that when arm 66 is forced to the right as viewed in FIG. 6 the space between the inner surface of pointer 70 and the forward end of tab 68 is sufficient to provide a clearance for dial 40 so that arm 66 can be rotated relative to dial 40. Arm 66 is constructed of a material having sufficient natural resilience to normally bias tab 68 forwardly into interlocking engagement within the selected radial slot 44. The radial overlapping relationship between pointer 70 and the forward side of dial 40 prevents movement of arm 66 rearwardly—i.e., to the right as viewed in FIG. 6—beyond the normal elastic limit of arm 66.

Cam assembly 56 is similarly provided with an integral disc 74 and resilient arm portion 76 fixedly mounted upon the main cam plate 78. The outer end of arm 76 of cam assembly 56 is formed with a similar pointer 80 and tab 82 adapted to cooperate with radial slots 42 in dial 40 in the same fashion as described above in connection with tab 68 and pointer 70 of cam assembly 54. Again, disc portion 78 serves as a spacer between cam plate 78 of assembly 56 and a third cam plate 84 of cam assembly 58. Cam assembly 58 is likewise provided with an arm 86, tab 88 and pointer 90 which cooperate with the radial slots 44 of dial 40 as described above.

Cam assembly 56 is employed to control operation of a limit control switch designated generally 92 (FIG. 5) which includes a switch actuating cam follower 94 having a follower roller 96 engaged with the periphery of cam plate 78. Cam assemblies 54 and 58 cooperatively control actuation of a fan control switch designated generally 98 (FIG. 5) which includes a cam follower 100 having a roller 102 engageable with the peripheral portions of both of cam plates 64 and 84.

Switches 92 and 98 are of conventional construction and are of the type in which a semi-circular spring member such as 104 is coupled between the cam follower and a movable contact carrying arm such as 106 of switch 92 to be shifted over center to bias the contact carrying arm to either of two positions, depending upon the relationship of the cam follower to the contact carrying arm. In FIG. 5, switch 92 is shown with its contact carrying arm in the switch closed position in which the movable contact of the switch is engaged with the fixed contact. Switch 98 is shown with the corresponding movable contact disengaged from the fixed contact of the switch.

To control the actuation of switch 92, the peripheral surface of cam plate 78 is formed with a large diameter section 108 and a small diameter section 110 separated from large diameter section 108 by an inclined transition section 112. Switch 92 is mounted upon frame 10 by a pair of bolts 114 and 116, bolt 114 passing through a circular bore of suitable diameter, not shown, and bolt 116 passing through an elongate slot 118 in the casing of switch 92, the longitudinal extent of slot 118 lying on a circular arc centered on the bore through which mounting bolt 114 passes. When switch 92 is initially mounted upon frame 10, bolt 114 is threaded into the frame and is loosely clamped. Switch 92 is then pivoted about bolt 114 with cam follower roller 96 in engagement with transition section 112 of the periphery of cam plate 78 until switch 92 is located on frame 10 at a location wherein the snap-over point of switch 92 occurs when the roller 96 is in contact with the approximate midpoint of transition portion 112. Bolt 116 is then tightened to clamp switch 92 to the frame in this adjusted position. With switch 92 mounted in the foregoing manner, the contacts of switch 92 will be closed, as shown in FIG. 5, whenever roller 96 is in contact with any portion of large diameter section 108 of the periphery of cam plate 78. Upon rotation of cam plate 78 to a position such that transition section 112 is rotated into contact with roller 96, switch 92 will snap-over to open its contacts as the midpoint of transition section 112 is rotated past engagement with follower roller 96. Whenever roller 96 is in contact with small diameter portion 110 of cam plate 78, switch 92 will be in an open position corresponding to the condition of switch 98 as illustrated in FIG. 5. Thus, rotation of cam plate induced by rotation of shaft 34 by thermally induced spiral flexing of spiral bimetal 24 is employed to actuate switch 92 in accordance with the temperature sensed by bimetal 24. In the usual case, switch 92 is connected to control operation of the furnace of a forced hot air heating system. By rotatably adjusting the position of cam plate 78 relative to shaft 34 by manipulation of resilient arm 76 and tab 82 as previously described, a limiting temperature at which the furnace is turned off may be selected. This limiting temperature is selected independently of the setting of the conventional furnace controlling room thermostat to prevent excessive temperatures within the heating system.

Switch 98 is under the joint control of cam assemblies 54 and 58 and the control of switch 98 is such that the switch is driven to a closed position on the sensing of a first selected temperature and is opened at a second selected temperature different than the switch closing temperature by a selected number of degrees. To accomplish this, cam plate 64 of cam assembly 54 is formed with a large diameter peripheral portion 120, a small diameter peripheral portion 122 and an inclined transition section 124 extending from large diameter section 120 to small diameter section 122. The respective diameters of sections 120 and 122 are the same as the large and small diameter sections 108 and 110 of cam plate 78.

Cam assembly 58 has the peripheral surface of cam plate 84 formed with a constant diameter section 126 which terminates at one end in an inclined transition section 128. The diameter of constant diameter section 126 of cam plate 84 is, as best seen in FIG. 5, of a diameter midway between the diameters of large diameter section 120 and small diameter section 122 of cam plate 64.

Switch 98 is mounted on frame 10 in the same fashion as switch 92. A first bolt 130 passes through a circular bore, not shown, in the casing of switch 98 to define an axis of pivotal adjustment of switch 98 about which switch 98 may be pivoted within limits defined by the engagement between a second bolt 132 with the end walls of an elongate slot 134 in the switch casing of switch 98. Switch 98 is adjustably positioned upon frame 10 by engaging follower roller 102 of switch 98 with the constant diameter section 126 of the peripheral surface of cam plate 84. Switch 98 is carefully adjusted until switch 98 is so located that the switch is precisely balanced upon its snap-over point when follower roller 102 is in engagement with peripheral surface 126 of cam assembly 58. Switch 98 is then firmly clamped to frame 10 by tightening screws 130 and 132. Cam assemblies 54 and 58 are then rotatably adjusted to selected positions about shaft 34 in accordance with the desired temperatures at which operation of the fan is to be started or stopped. A typical adjustment is indicated in FIG. 5 in which it will be noted that cam assemblies 54 and 58 are rotatably located relative to each other such that the peripheral surface of the cam as engaged by roller 102 has three stepped sections of successively increasing diameter, the first section being formed by small diameter section 122 of cam assembly 54. The second or intermediate step is formed by that portion of constant diameter section 126 of cam assembly 58 which angularly overlaps transition section 124 of cam assembly 54. Large diameter section 120 of cam 54 forms the third step.

With the adjustment made as indicated in FIG. 5, thermally induced rotation of shaft 34 occasioned by the sensing of an increasing temperature by bimetal 24 will rotate cam assembly 54 and 58 as a unit and advance transition section 128 of cam assembly 58 into engagement with follower roller 102 of switch 98. Continued rotation of the cam assemblies in a counterclockwise direction as viewed in FIG. 5 causes roller 102 to climb up the inclined transition section 128 and to pass along constant diameter section 126 of cam assembly 58. Because of the adjusted setting of switch 98 relative to the cam assemblies as described above, switch 98 is urged up to the snap-over point but the snap-over does not occur since the adjusted setting finds the switch precisely balanced when roller 102 is in engagement with constant diameter section 126 of cam assembly 58. Continued counterclockwise rotation of the assembly eventually shifts transition section 124 of cam assembly 54 into engagement with roller 102. As roller 102 begins to climb up transition section 124, switch 98 is driven beyond its snap-over point and the switch snaps to close the contacts of switch 98. Continued rotation of the assembly in a counterclockwise direction has no further effect upon switch 98 since roller 102 is moved into engagement with large diameter section 120 of cam assembly 54 which positively maintains contacts of switch 98 in their closed condition.

Upon cooling of bimetal 24, shaft 34 begins to rotate in a clockwise direction from the last described position, thus successively advancing transition section 124 and constant diameter section 126 of cam assembly 58 into engagement with roller 102. The contacts of switch 98 remain in their closed position since the switch is balanced on its snap-over point. Switch 98 does not snap-over to return to the open position until roller 102 engages transition section 126 onto transition section 128, follower 102 moves to the left as viewed in FIG. 5 a sufficient distance to carry the switch assembly back beyond its snap-over point and the contacts return to the position illustrated in FIG. 5.

From the foregoing description, it is seen that the contacts of switch 98 may be either open or closed when the roller 102 of switch 98 is engaged with constant diameter section 126 of cam assembly 58. Switch 98 is moved to its closed position when roller 102 is transferred from section 126 to transition section 124 of cam assembly 54. Switch 98 is opened when roller 102 is moved from section 126 to transition section 128.

By the foregoing arrangement, operation of the blower fan of the heating system is controlled to turn the blower fan on when a predetermined temperature is reached within the heating system. Operation of the fan is continued, once the desired initial temperature is reached, until the temperature within the heating system drops to a selected temperature well below the initial fan starting temperature. The specific fan on and fan off temperatures are selected by the relative rotative positions of cam assemblies 54 and 58 upon shaft 34.

In some instances, it is desirable to employ the blower of a forced air heating system for the purposes of circulating air during periods in which concurrent operation of the heater of the system is not desired. The control device described above is readily adapted for operation of this type by a self-contained control sub-assembly designated generally 150.

Control assembly 150 includes a sheet metal frame having a downwardly projecting leg 152, a horizontally projecting arm portion 154 (FIG. 1) and an upwardly projecting apertured plate 156 laterally offset from leg 152. Leg 152, arm 154, and plate 156 are integral with each other and may be conveniently formed from a single piece of sheet material. The upper portion of frame 10 is formed with a slot 158 (FIG. 1) through which leg 152 may be inserted. A pair of outwardly bowed clip portions 160 integral with each side of arm portion 154 pass downwardly through respective slots such as 162 (FIG. 1) to resiliently lock assembly 150 in position upon frame 10. An actuating arm 164 is pivotally supported upon leg 152 as by a rivet 166, the lower end of arm 164 projecting downwardly below the end of leg 152 to a location such that the lower end of arm 164 is operatively aligned with roller 102 of switch 98 when assembly 150 is mounted upon frame 10. Arm 164 projects upwardly through slot 158 and is bent forwardly as at 168 (FIG. 1) to project through an aperture 170 in plate 158. Aperture 170 is curved to accommodate pivotal movement of arm 170 and projection 68 about the axis defined by pivot 166. Leg portion 152 is formed with a resilient detent strip 172 which engages arm 164 to hold arm 164 in either end limit of pivotal movement.

With assembly 150 positioned on frame 10 as shown in FIG. 5, operation of switch 98 is under the automatic control of bimetal 24 when arm 164 is in the position shown in FIG. 5. If it is desired to operate the fan independently of the heating portion of the system, arm 164 may be manually pivoted in a clockwise direction about pivot 166 to dispose projection 168 at the opposite end of aperture 170. Pivotal movement of arm 164 in the foregoing manner shifts the lower end of arm 164 into engagement with roller 102 to manually drive switch 98 to its closed position.

While one exemplary embodiment of the invention has been described, it will be apparent to those skilled in the art that the disclosed embodiment may be modified. Therefore, the foregoing description is to be considered exemplary rather than limiting, and the true scope of the invention is that defined in the following claims.

We claim:

1. In a control device having a housing, a shaft rotatably mounted in said housing, and control condition responsive means for rotatably positioning said shaft relative to said housing in accordance with the magnitude of a control condition; a circular dial mounted upon said shaft for rotation therewith, a first cam mounted on said shaft for rotation relative to said shaft, a first peripheral portion of a first constant diameter on said first cam, a second peripheral portion of a second constant diameter on said first cam, a transition portion on the periphery of said first cam extending from one end of said first portion to the adjacent end of said peripheral portion, a second cam mounted upon said shaft for rotation relative to said shaft and to said first cam at a location axially adjacent said first cam, a third peripheral portion on said second cam of a third constant diameter intermediate said first and said second diameters, a cam follower engageable with the peripheral portions of both of said cams, an over center switch mechanism actuable by said cam follower to a first position when said follower is engaged with said first peripheral portion and actuable to a second position when said follower is engaged with said second peripheral portion, said switch mechanism being operable to remain in its last actuated position when said follower is engaged with said third peripheral portion, positive engagement coupling means for releasably locking said cams to said dial for concurrent rotation with said shaft at selected positions of angular adjustment relative to each other wherein said third peripheral portion of said second cam overlaps said transition portion of said first cam and a selected portion of the smaller diameter peripheral portion of said first cam, and an auxiliary control assembly comprising a frame, cooperating means on said frame and said housing comprising means defining an opening in said housing adapted to receive said frame, resilient clip means on said frame engageable with said housing to detachably secure said frame to said housing, a lever member pivotally mounted on said frame and projecting into said housing, and means for selectively locating said lever member in a first position clear of said cam follower, or in a second position wherein said lever is engaged with said cam follower member to maintain said switch mechanism in one of said first and second positions independently of the rotative position of said cams.

2. In a control device as defined in claim 1, said positive engagement coupling means comprising a radial arm on each of said cams, an axially extending tab on the outer end of each of said arms, and means on said circular dial defining a plurality of uniformly spaced radial slots in said dial adapted to receive said tabs to rotatably couple the respective cams to said dial.

3. In a control device as defined in claim 2, the further improvement wherein said arms resiliently bias their respective tabs axially toward said dial to maintain the tabe within the selected radial slots.

4. In a condition responsive device comprising a housing, a control actuating member mounted in said housing for movement between a first and a second position, and condition responsive cam means mounted within said housing for movement in response to variations in a control condition, said cam means being operatively engaged with said actuating member to locate said actuating member in said first or said second position in accordance with the position of said cam means relative to said housing; an auxiliary control assembly comprising a frame, lever means pivotally mounted upon said frame, cooperating means on said frame and said housing for detachably mounting said frame on said housing with said lever means projecting into said housing adjacent said cam means, means for selectively locating said lever means in either of a first pivotal position wherein said lever means is located clear of said actuating member or in a second pivotal position wherein said lever means is engaged with said actuating member to maintain said actuating member in its second position regardless of the position of said cam means relative to said housing, and said cooperating means comprising means defining an opening in said housing adapted to receive said frame, and resilient clip means on said frame engageable with said housing to detachably secure said frame to said housing.

5. In a condition responsive device comprising a housing, a control actuating member mounted within said housing for movement to and from an actuated position, and condition responsive means mounted within said housing for movement in response to variations in a control condition and engageable with said actuating member to move said actuating member to and from said actuated position in accordance with the position of said condition responsive means; a slot in said housing, a frame having a leg member received in said slot, an apertured plate formed on the frame offset from said leg member and disposed to project from said housing, spring-clip means secured to said leg member engageable with said slot to resiliently, detachably secure the frame to said housing, an actuating arm pivotally mounted on the leg member with one end disposed in the plane of movement of the actuating member and the other end of said actuating arm projecting at an angle from the actuating arm and received in the aperture of said plate, and detent means in said leg member engageable with said actuating arm for maintaining said actuating arm in one of two selected positions, said actuating arm in one of said positions being clear of said actuating member, and in the second of said two positions being engaged with said actuating member to maintain said actuating member in said actuated position independently of the position of said condition responsive means.

References Cited in the file of this patent

UNITED STATES PATENTS

| | | |
|---|---|---|
| 2,372,491 | Hausler | Mar. 27, 1945 |
| 2,532,383 | White | Dec. 5, 1950 |
| 2,633,517 | Gustafson | Mar. 31, 1953 |
| 2,774,847 | Ray et al. | Dec. 18, 1956 |